June 9, 1925.  O. H. WILLIAMS  1,541,756

CLOSURE FOR CONDUITS

Filed Jan. 17, 1924

Inventor
ORR H. WILLIAMS
his Attorneys

Patented June 9, 1925.

1,541,756

UNITED STATES PATENT OFFICE.

ORR H. WILLIAMS, OF COLUMBUS, OHIO, ASSIGNOR TO THE LANCASTER TIRE AND RUBBER COMPANY, OF COLUMBUS, OHIO, A CORPORATION OF OHIO.

CLOSURE FOR CONDUITS.

Application filed January 17, 1924. Serial No. 686,925.

*To all whom it may concern:*

Be it known that I, ORR H. WILLIAMS, a citizen of the United States, residing at Columbus, in the county of Franklin and State of Ohio, have invented a certain new and useful Improvement in Closures for Conduits, of which the following is a specification.

Conduits for leading electric conductors into houses, buildings and other structures frequently constitute the means for admitting noxious or explosive gases into such structures thereby endangering the health, lives and limbs of the occupants. The primary object of the present invention is to provide improved means whereby the conduit may be plugged and such gases satisfactorily excluded from passing into the dwelling or building although the invention can be utilized at any point or points in a conduit where it is desirable to arrest or prevent the flow of any fluid from the conduit or one point to another in the conduit.

The invention is embodied in the example herein shown and described, the features of novelty being finally claimed.

In the accompanying drawing—

Figure 1:
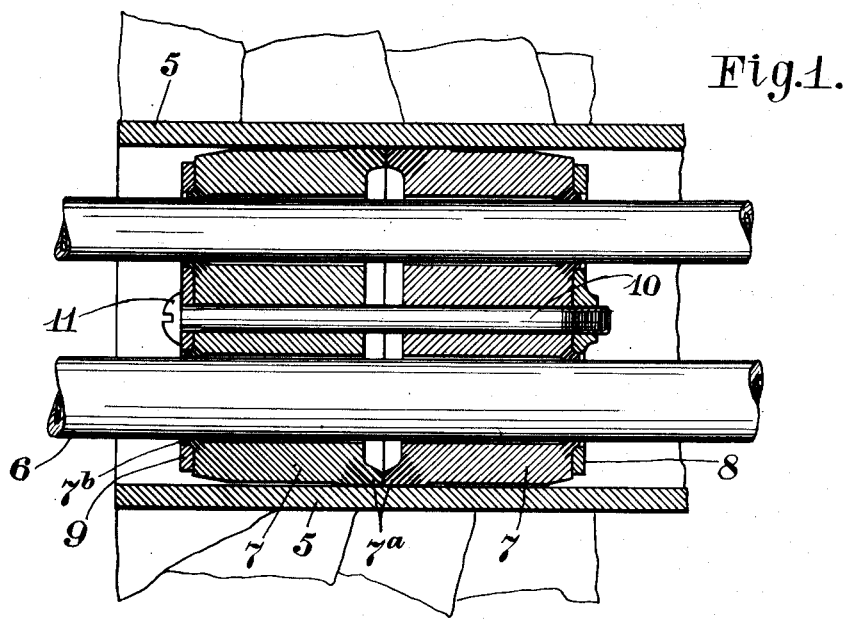
Figure 1 is a sectional view taken longitudinally of a fraction of a conduit showing my invention applied thereto.
Figures 2, 3:
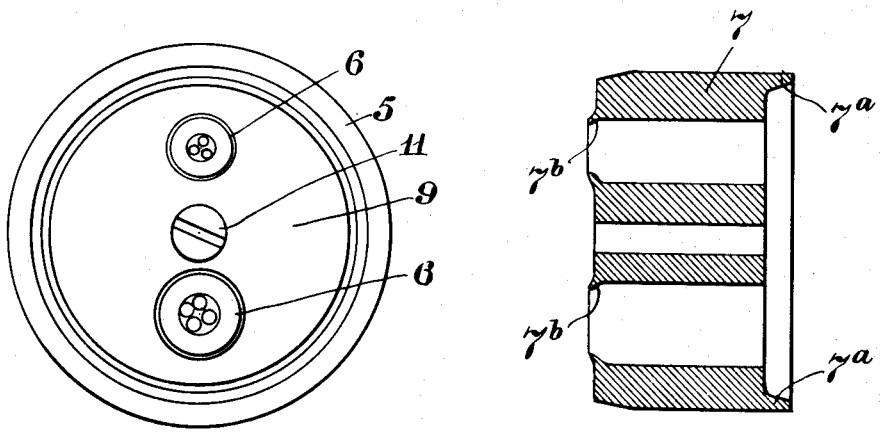
Fig. 2 is a view looking at the left hand end of the conduit and its contents as shown in Fig. 1.
Fig. 3 is a section of one of the members of the pair constituting the plug member before application to the conduit the two members of such pair being preferably and economically identical.

In the views 5 designates the fraction of a conduit which is of usual material and which is shown herein as it terminates at the inner side of a cellar wall. 6 designates the usual cable for carrying the electrical conductors. 7 designates a septum or plug composed in the present instance of two identical parts of a suitable compressible or resilient material such for example as rubber or a compound thereof adapted to serve as a packing to resist the passage of a fluid. The parts of this septum of plugging member are shown as normally formed or molded with an annular substantially horizontally extending lip 7ª and a perforation the rim of which at the other side of septum has an inwardly extending lip 7ᵇ.

8 designates the inner or right hand compression member and 9 the left hand or other compression member. These two members are preferably alike in form.

The parts comprising the septum or plug and both compression members are provided with coinciding perforations for the passage of as many cables as may be necessary.

The parts of the septum and both the compression members are also provided with central coinciding openings for the passage of a threaded bolt 10 having a head on one end, that is kerfed to receive a driver, the threaded end adapted to engage the inner plate 8 for drawing the compression members toward each other and against the opposite sides of the septum of plug. The parts can be connected prior to drawing the compression members together to effect the closure.

When installed in a conduit the parts of the plug are placed in reversed position that is with their concave sides in contact with each other. When all the parts are assembled as indicated pressure is applied to the two compression members by turning up the bolt with the effect that the contiguous lips 7ª are pressed out against the inner side of the conduit thereby making a fluid tight closure. When the parts of the plug are placed on the cable the lips 7ᵇ are spread out and cling to the cable but when the compression members are drawn together the corners of the compression members at the perforations through which the bolt and the cable pass squeeze said lips against the cable and bolt thereby insuring fluid tightness in the closure around said parts.

I have conventionally illustrated to some extent the effect of the two sorts of compression by thickening the section lines of the septum at the points where compression takes place.

My invention can be economically applied, and it affords an effective preventive of the passage through or from the conduit of dangerous gases in appreciable quantity such as might threaten the health and lives or limbs of the occupants of a building.

The forms of the parts can be changed without departing from the gist of the invention as claimed.

What I claim is—

Means for plugging conduits for electrical conductors comprising, in combination, a septum of elastic material for the conduit composed of two parts having lips facing each other, said septum provided with eccentrically located perforations for the reception of the electrical conductors, said septum, having annular inwardly projecting lips at said perforations, central compression members of inelastic material for the parts of said septum, and means engaging said compression members for drawing and holding them together to expand the first mentioned lips into pressing contact with the inner wall of the conduit and the lips of the eccentrically located perforations in pressing contact with the conductors in said perforations.

ORR H. WILLIAMS.